United States Patent
Gilstrap et al.

(10) Patent No.: US 7,000,812 B2
(45) Date of Patent: Feb. 21, 2006

(54) BICYCLE WHEEL BAG

(76) Inventors: Keith Gilstrap, 1818 Colorado Ave. #103, Glenwood Springs, CO (US) 81601; Doug Golenz, 942 Sunflower st., Louisville, CO (US) 80027

( * ) Notice: Subject to any disclaimer, the term of this patent is extended or adjusted under 35 U.S.C. 154(b) by 5 days.

(21) Appl. No.: 10/613,338

(22) Filed: Jul. 2, 2003

(65) Prior Publication Data

US 2005/0000990 A1    Jan. 6, 2005

(51) Int. Cl.
*B62J 9/00* (2006.01)

(52) U.S. Cl. ............. 224/426; 224/42.2; 224/417; 224/437; 224/439; 224/463; 224/924

(58) Field of Classification Search ......... 224/417, 224/419, 424, 425, 426, 437, 433, 435, 439, 224/463, 42.2, 924; 280/304.5, 288.4, 202; D12/409; 190/130
See application file for complete search history.

(56) References Cited

U.S. PATENT DOCUMENTS

| | | | |
|---|---|---|---|
| 577,910 A | 3/1897 | Bierbach | |
| 672,540 A | 4/1901 | Speir | |
| 1,203,398 A | 10/1916 | Perkins | |
| 1,234,409 A | 7/1917 | Strifler | |
| 1,442,285 A | 1/1923 | McKay et al. | |
| 1,485,067 A * | 2/1924 | Bristol | 224/426 |
| 1,577,792 A | 3/1926 | Duck et al. | |
| 1,839,997 A | 1/1932 | Rutledge | |
| 1,886,549 A | 11/1932 | Howell et al. | |
| 1,963,333 A * | 6/1934 | Morales | 224/422 |
| 3,338,484 A | 8/1967 | Hall, Sr. | |
| 3,848,784 A * | 11/1974 | Shimano et al. | 224/323 |
| 3,888,397 A * | 6/1975 | Koizumi | 224/421 |
| 3,938,716 A * | 2/1976 | Jackson et al. | 224/424 |
| 4,262,829 A * | 4/1981 | Hine et al. | 224/430 |
| 4,271,996 A * | 6/1981 | Montgomery | 224/430 |
| 4,437,597 A | 3/1984 | Doyle | |
| 4,460,114 A * | 7/1984 | Grenier | 224/435 |
| 4,720,027 A * | 1/1988 | Board | 224/439 |
| 4,852,778 A * | 8/1989 | Beiser et al. | 224/417 |
| 4,993,609 A * | 2/1991 | Flint | 224/42.2 |
| 5,031,807 A * | 7/1991 | Tiffany | 224/429 |
| 5,085,360 A | 2/1992 | Fortune et al. | |
| 5,242,183 A | 9/1993 | Oberg | |
| 5,249,721 A * | 10/1993 | Brooks | 224/426 |
| 5,377,886 A * | 1/1995 | Sickler | 224/521 |
| 5,437,171 A | 8/1995 | Owen | |
| 5,467,906 A | 11/1995 | Forman | |
| 5,558,261 A | 9/1996 | Hedeen | |
| 5,588,661 A | 12/1996 | Wolfe | |
| 5,639,001 A | 6/1997 | Brady | |
| 5,678,796 A | 10/1997 | James | |
| 5,692,659 A | 12/1997 | Reeves | |
| 5,702,040 A | 12/1997 | Hedeen | |

(Continued)

OTHER PUBLICATIONS

Wheel bags, CDISports, Performance Bicycle, 2 pages; (found on web search).*

*Primary Examiner*—Gary E. Elkins
(74) *Attorney, Agent, or Firm*—Leyendecker and Lemire, LLC; Kurt Leyendecker

(57) ABSTRACT

A wheel bag for enclosing a bicycle wheel and attaching to a bicycle for transport along with a method for using the bag are described. In one embodiment, the bag is configured to be secured to a bicycle at three points while the bicycle is in a rooftop carrier for transport on an automobile.

13 Claims, 5 Drawing Sheets

U.S. PATENT DOCUMENTS

| | | |
|---|---|---|
| 5,779,119 A | 7/1998 | Talbot et al. |
| 5,810,231 A | 9/1998 | Kravitz |
| 5,836,492 A | 11/1998 | Allen |
| 5,935,878 A * | 8/1999 | Glasser .................. 442/30 |
| 6,029,875 A * | 2/2000 | Johnston .................. 224/417 |
| 6,253,979 B1 * | 7/2001 | Samson .................. 224/426 |
| 6,336,649 B1 | 1/2002 | Lin |
| 6,612,350 B1 * | 9/2003 | Brynjulfsen .............. 150/118 |

* cited by examiner

BICYCLE WHEEL BAG

RELATED APPLICATIONS

U.S. Pat. No. 6,817,502 entitled "Bicycle Wheel Holder" filed on Aug. 23, 2002; patent application Ser. No. 10/613,339 entitled "Handlebar/Stem Mounted Bicycle Wheel Holding Device" filed concurrently with this application; and patent application Ser. No. 10/613,343 entitled "Seatpost Mounted Bicycle Wheel Holder" also filed concurrently with this application are all commonly owned along with this application and are hereby incorporated by reference in their entirety herein.

FIELD OF THE INVENTION

This invention relates generally to an enclosure for containing a bicycle wheel. More specifically, the invention relates to an enclosure, such as a wheel bag or hard shell container, that is removeably mountable to a bicycle for carrying the bicycle wheel such as during transport of the bicycle.

BACKGROUND

Many types of rooftop bicycle carriers (or racks) require the front wheel of a bicycle be removed when mounting the bicycle on the carrier. The front wheel is typically stowed in the vehicle or is secured to the rooftop carrier using a separate fixture that clamps to the wheel at its axle. As can be appreciated, the wheel may be dirty, especially if the wheel is from a mountain bike, and putting a dirty wheel in the vehicle is often undesirable. The separate wheel fixtures that mount directly to the carrier are also often undesirable because they can be expensive and take up limited rooftop space that could otherwise be used to carry additional bicycles.

Several wheel holders have been proposed to stow the front wheel while the bicycle is being transported on a rooftop carrier. In U.S. Pat. No. 5,588,661 of Wolfe, a bracket is disclosed that is affixed to the rear dropout of a bicycle frame. When the bicycle is placed on the rooftop carrier, the axle of the front wheel is secured into a slot provided in the bracket by tightening the wheel's quick release mechanism. The bracket has several drawbacks. First, it is not easily removable from the bicycle and is intended to remain on the bicycle adding unnecessary weight. Second, since the front wheel is supported at the axle on only one side of the axle, the stress on the axle from the weight of the wheel and wind resistance during transport could cause damage to the axle and the wheel's hub.

In U.S. Pat. No. 5,779,119 of Talbot, a wheel holder is disclosed that is secured onto the seatpost of a bicycle and includes an extension leg with spaced fingers extending therefrom. The fingers have slots formed in their distal ends and the slots are adapted to receive the axle of the bicycle's front wheel. The holder requires the use of a clamping mechanism to secure it to the seatpost. While Talbot clamping mechanism may be effective in attaching the holder to the bicycle's seatpost, it requires several interconnected moving parts that increase the total cost to produce the holder, especially when compared to a holder with an attachment mechanism that does not include interconnected moving parts. Further, since the fingers of the Talbot holder are shorter than the radius of the front wheel, the extension leg of the holder must be passed through the spokes of the intended bicycle wheel so that the spaced slots can be aligned with the ends of the wheel's axles. As can be appreciated, passing the extension arm through the spokes with the slotted fingers that extend perpendicularly therefrom can be awkward especially when the associated front wheel includes closely spaced spokes. Finally, the design of the Talbot holder requires the device to extend in a direction generally perpendicular to the bicycle. Given this configuration, the wheel and the end of the extension arm could interfere with the mounting of additional bicycles onto an associated rooftop carrier, especially when more than two bicycles are to be transported by a single carrier.

Wheel bags for enclosing and carrying a bicycle wheel are well known in the art. Typically, these bags are used to store a bicycle wheel in a vehicle while the bicycle is being transported either by an automobile or by way of commercial transportation such as an airplane, bus or train. By enclosing the wheel in a bag, the surfaces of the vehicle are protected from any dirt, grease and grime that may be on the wheel. When transporting a bicycle on a rooftop carrier, a person using a prior art wheel bag typically places the bag in the automobile, whether on an unused seat or in a cargo area of the vehicle, such as a trunk. As can be appreciated, placing the wheel bag in the vehicle takes up cargo space, especially if more than one wheel bag must be placed in the vehicle and more than one person and bicycle are being transported.

SUMMARY OF THE INVENTION

In a first preferred embodiment, a bag for containing a bicycle wheel and attaching to a bicycle is described. The bag includes an enclosure sized to substantially contain a bicycle wheel. The enclosure has at least first and second opposing faces. A first connector is attached to the enclosure on or proximate the first face at a first location. A second connector is attached to the enclosure on or proximate the first face at a second location. A third connector is attached to the enclosure on or proximate the first face at a third location. Each location forms a corner of a hypothetical triangle and each connector is adapted to securely attach with a portion of the bicycle.

In a second preferred embodiment, another wheel bag for carrying a wheel of a bicycle is described. The wheel bag comprises a substantially fabric enclosure, and at least three strap connectors attached to the enclosure. The enclosure includes a closable opening through which the wheel is put into the bag. The strap connectors include at least one strap and one or both of a (i) buckle and (ii) hook and loop material. The strap connectors are adapted to secure the enclosure to the bicycle.

In a third preferred embodiment, a method comprising substantially enclosing a front wheel from a bicycle within an enclosure, and securing the enclosure to the bicycle at two or more locations is described.

Numerous other embodiments and variations of the embodiments are also contemplated as is provided in this specification including the appended claims and as would be obvious to one of ordinary skill in the art with the benefit of this disclosure.

DETAILED DESCRIPTION

A wheel bag and a hard shell container for containing at least one wheel of a bicycle and attaching to the bicycle for transport are described. The bag or container is generally attached to the frame of the bicycle in at least three locations that are arranged in a pattern wherein all the locations are not located along a common line. Accordingly, the bag or container does not swing and pivot undesirably when the bicycle is being transported at high speeds on top of a rooftop carrier of an automobile. A shoulder strap and handle can also be provided for transporting the wheel bag or container when it is not connected to the bicycle. In one preferred embodiment, the wheel bag is attached to the frame tubes of a bicycle, particularly, the top tube and the down tube, although in variations and alternative embodiments, the wheel bag can be attached to different frame tube combinations or it can be attached to other elements of the bicycle such as, but not limited to, the handlebar stem, the handlebar and the seatpost.

Terminology

The term "or" as used in this specification and the appended claims is not meant to exclusive rather the term is inclusive meaning "either or both".

The Wheel Bag

Figure 1:
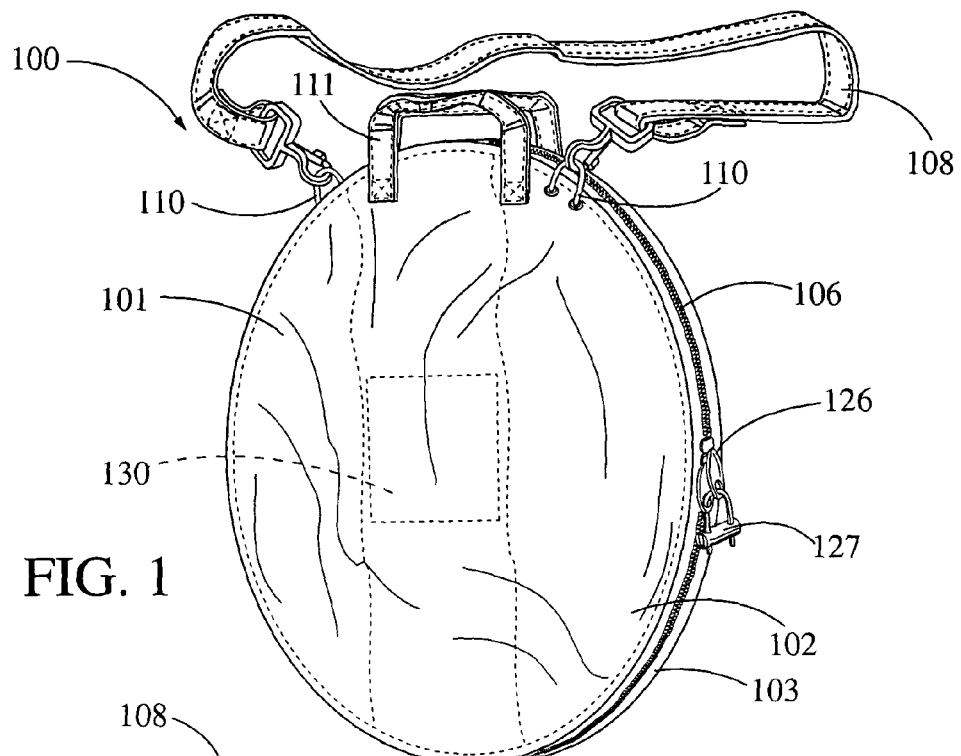
FIG. 1 is an isometric front view of one preferred embodiment of the wheel bag.
Figure 2:
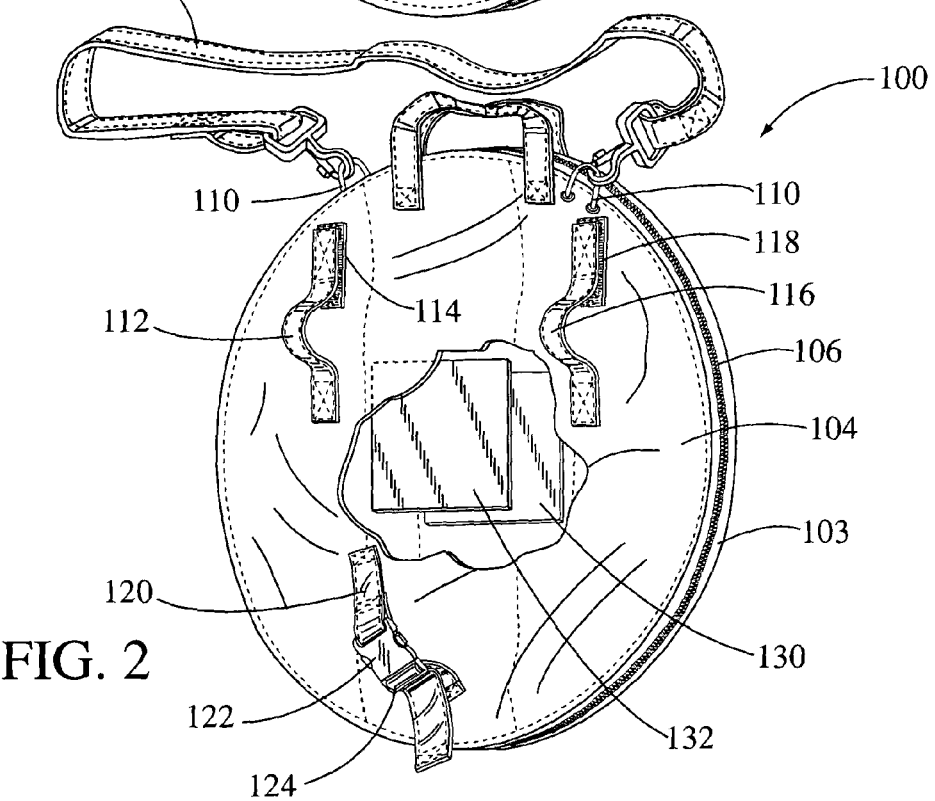
FIG. 2 is an isometric rear view of one preferred embodiment of wheel bag.

FIGS. 1 and 2 are illustrations of one preferred embodiment of the wheel bag 100. The bag includes (i) a generally circular enclosure 101 that generally corresponds to the size of the wheel 202 to be contained therein, and (ii) three primary connectors 112, 116, & 120 typically comprised of fabric straps that are attached to a rear face 104 of the enclosure to secure the wheel bag to a bicycle 200.

The enclosure 101 generally comprises front and rear faces 102 & 104 with a circumferential side 103 extending between the faces along the periphery of the faces. In the preferred embodiment, the faces are generally substantially fabric and in some variations at least a portion of the fabric on each face includes an elastic fiber such as spandex. The enclosure is typically sized such that the front and rear faces elastically expand when a wheel is placed therein causing the enclosure to be conformal about the wheel. In other variations of the front and rear faces, the fabric does not include spandex-type fibers to make the enclosure elastically stretchable and the fabric can include any suitable material, natural or synthetic, including, but not limited to, nylon, rayon, polyester, and cotton. In yet other variations, the faces could comprise a non-woven fabric similar to a Tyvex-type material or they can comprise a flexible sheet material such as translucent or opaque vinyl or neoprene. Finally, the front and rear faces need not be circular or round but can be square or rectangular or any other suitable shape.

The circumferential side 103 is typically made of a fabric or flexible sheet material, which may or may not be elastically stretchable. The width of the circumferential side is typically about 1–3" depending on the type of wheel to be carried therein. Generally, the circumferential side is sewn to the front and rear faces, although it can also be attached to the faces by any other suitable means including, but not limited to, adhesive bonding and riveting. The circumferential side 103 is typically at least partially bisected by a zipper 106, which is utilized to open or close the enclosure. Preferably, the zipper includes two zipper pull handles 126 that have holes passing therethough that can receive the shackle of a lock 127, a strap, a chain, or a rope to secure the zipper in the closed position. Depending on the variation of the preferred embodiment, the zipper can extend completely around the circumferential side such that the front and rear faces can be completely separated from one another. In another variation, the zipper does not completely encompasses the entire length of the circumferential side, wherein the front and rear faces are fixedly joined by the portion of the circumferential side without the zipper. In certain embodiments, the circumferential side is not differentiable from the respective front and rear faces wherein the zipper is attached to the periphery of the front and rear faces.

A plurality of primary connectors 112, 116 & 120 are positioned on the rear face 104 of the enclosure 101 and are provided for attaching the wheel bag with a wheel 202 contained therein to a bicycle 200. In one preferred embodiment, at least three connectors are provided that are not linearly disposed such that the location of each connector essentially forms the corner of a triangle relative to the locations of the other connectors. By using at least three connectors that are not all linearly disposed relative to each other, the bag can be attached to the bicycle in a manner that will not cause it to pivot about the connectors when being subjected to the wind that is created during transport of the bicycle at high speeds on top of an automobile. Additional connectors 134 and 136 (as shown in FIG. 3) can also be provided to further secure the bag to the bicycle.

Figure 3:
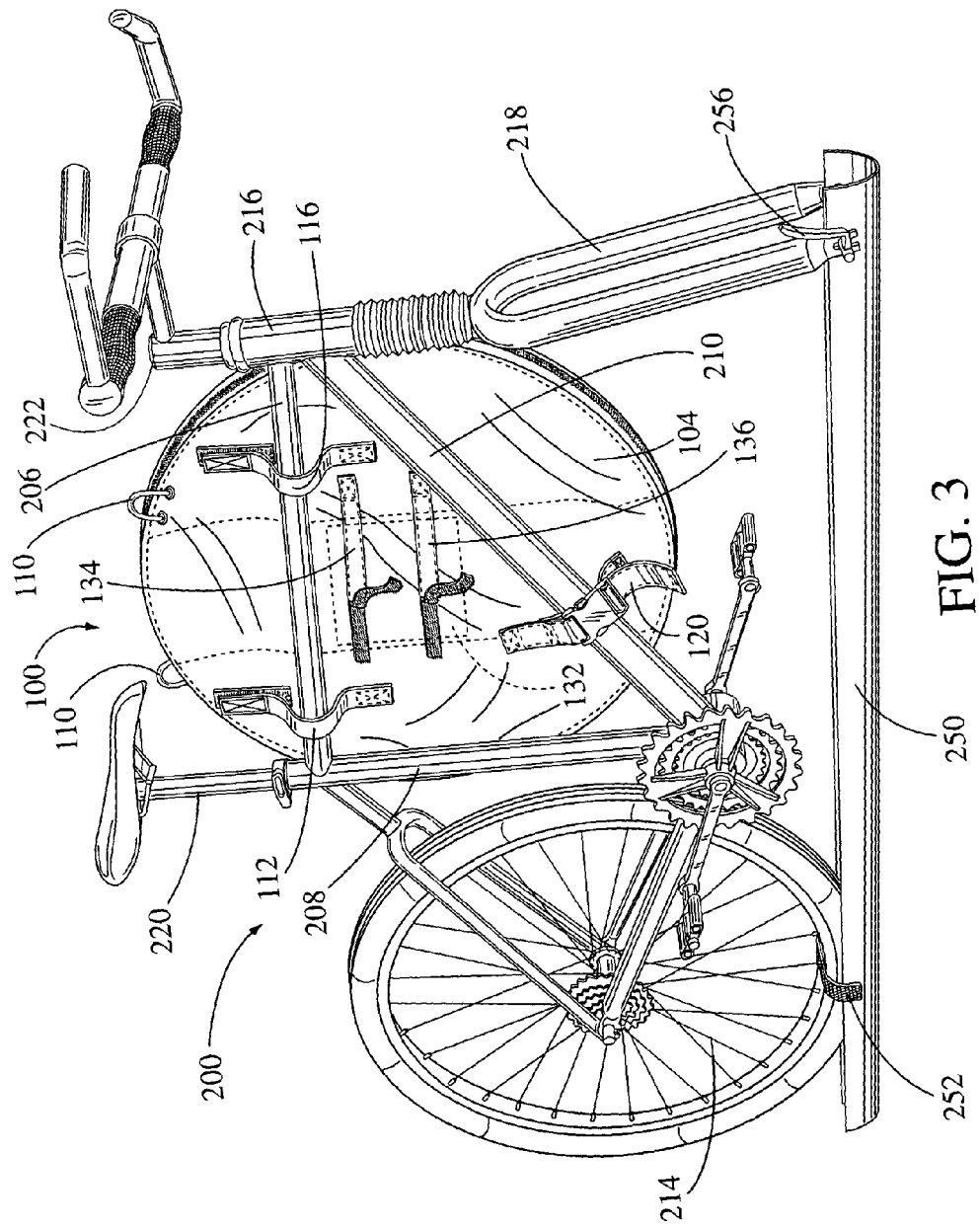
FIG. 3 is an isometric rear view of one preferred embodiment of the wheel bag attached to the bicycle.
Figure 4:
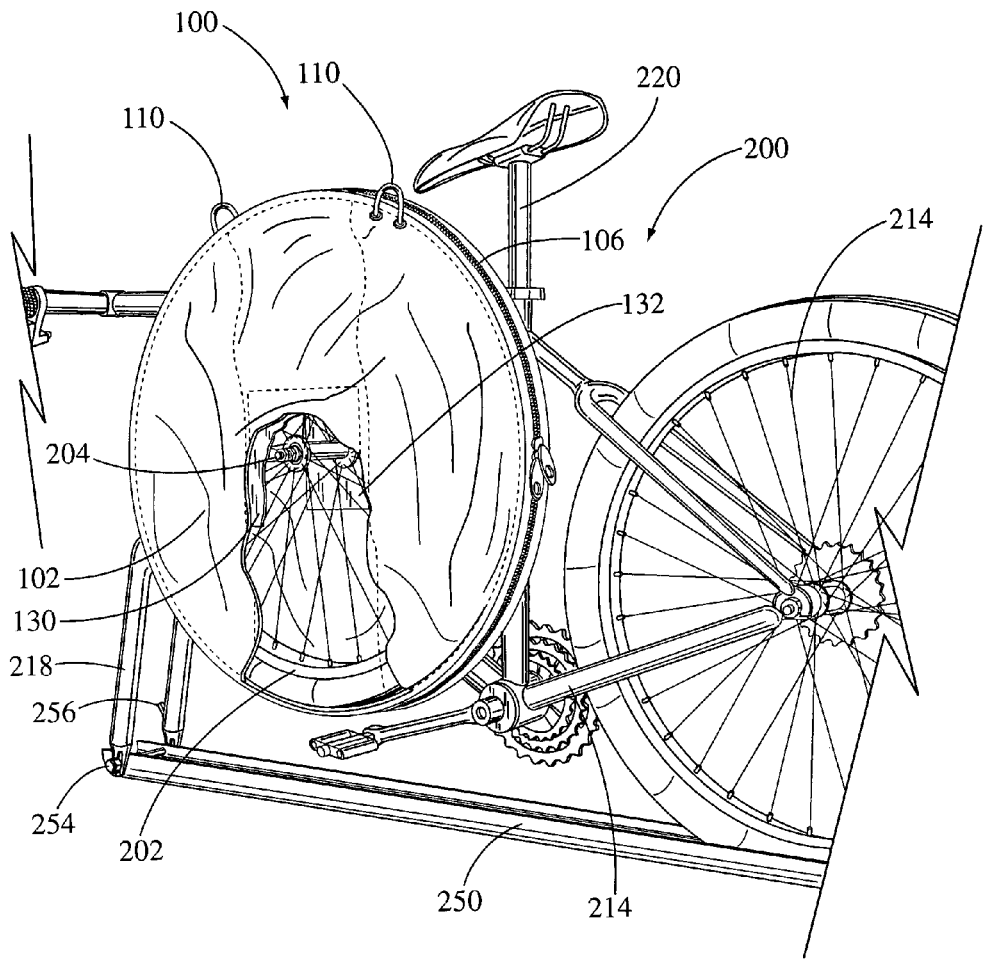
FIG. 4 is an isometric front view of one preferred embodiment of the wheel bag attached to a bicycle with a bicycle wheel contained therein.

Referring to FIGS. 3 and 4, the wheel bag is attached to the frame of a bicycle 200 in such a manner that the first and second connectors 112 & 116 are secured to the top tube 206 of the bicycle and the third connector 120 is secured to the bottom tube 210 of the bicycle. This attachment configuration is merely exemplary, and any numbers of other attachment configurations are possible that will also adequately attach the wheel bag to the bicycle. For instance, one connector can be secured to the seatpost 220, while the other two connectors are attached to one or both a chainstay tube 214 or the down tube 210. Further, one or both of the additional connectors 134 & 136 can be attached to the seat tube 208. In another configuration, one connector could be attached to the stem 222 or head tube 216, and one of the other connectors attached to the top tube 206 and the final connector attached to the down tube 210.

Referring to FIG. 2, the first and second of the illustrated connectors 112 & 116 comprise straps with a proximal end sewn to the rear face 104 of the bag and a distal end having a piece of hook or loop piece of material 114 & 118 attached thereto. The hook or loop material corresponds to a mating hook or loop material piece 114 & 118 attached to the rear face. Accordingly, the strap can be at least partially placed around the portion of the bicycle to which it is to be attached and then secured to the rear face by joining the associated hook and loop material pieces together. The third connector 120 comprises straps that are sewn to the rear face and are connectable by a buckle 122 with mating male and female sections. The straps are placed around a portion of the bicycle and hooked together. The straps can be of a fixed length or they can be adjustable, such as illustrated in FIG.

2, wherein one strap is looped through a slot 124 provided in one of the buckle sections. The additional connectors 134 & 136 as shown in FIG. 3 are generally similar to the first and second connectors comprising straps and hook and loop material, and can be used to further secure the wheel bag to the bicycle as desired. Of course, all the connectors can be of any suitable design and are not limited to the specific examples discussed herein. For instance, all three primary connectors can comprise buckles, or they can all comprise straps with hook and loop material. Additionally, the type of buckles can vary substantially as would be obvious to one of ordinary skill in the art. Other variations of the connectors may not use buckles or hook and loop material but rather buttons, snaps, ties, or some other suitable means of connecting the bag to the bicycle. Further, suitably configured clamps can be used in place of the straps on one or all of the connectors.

The illustrated embodiment of the wheel bag includes a strap handle 111 that can be utilized to carry the bag when it is off the bicycle. Further, two shoulder strap loops 110 are provided on the enclosure: one on the front face and one on the rear face. A removable shoulder strap 108 can be attached to the loops to facilitate the carrying of the wheel bag without the use of one's hands. It is to be appreciated that in different variations and other embodiments of the bag, different types of handles and shoulder straps can be provided or they may not be provided at all. In one variation, the strap of one of the three primary connectors can also be used as a handle to carry the bag.

As illustrated in the cutaway section of FIG. 2, one or two plastic pieces 130 & 132 can be provided proximate the center of the bag where the axles of a wheel 202 would protrude from the wheel's hub 204 (See FIG. 4). Generally, the plastic pieces are made of sheet nylon, polypropylene, polyethylene or any suitable plastic and are mounted to the inside surfaces of the front and rear faces 102 & 104 to protect the faces from being punctured or otherwise damaged by the axle and/or quick release skewers of the wheel's hub. The plastic pieces can be mounted to the inside surfaces of the front and rear faces by any suitable means such as, but not limited to, sewing and adhesive bonding. In one embodiment, the plastic pieces are slid into fabric pockets provided on the inside of the faces. In other embodiments, no plastic pieces are utilized especially if the faces are comprised of an abrasion or puncture resistant material, such as a heavy nylon cloth.

An Alternative Embodiment Hard Shell Wheel Container

Figure 5:
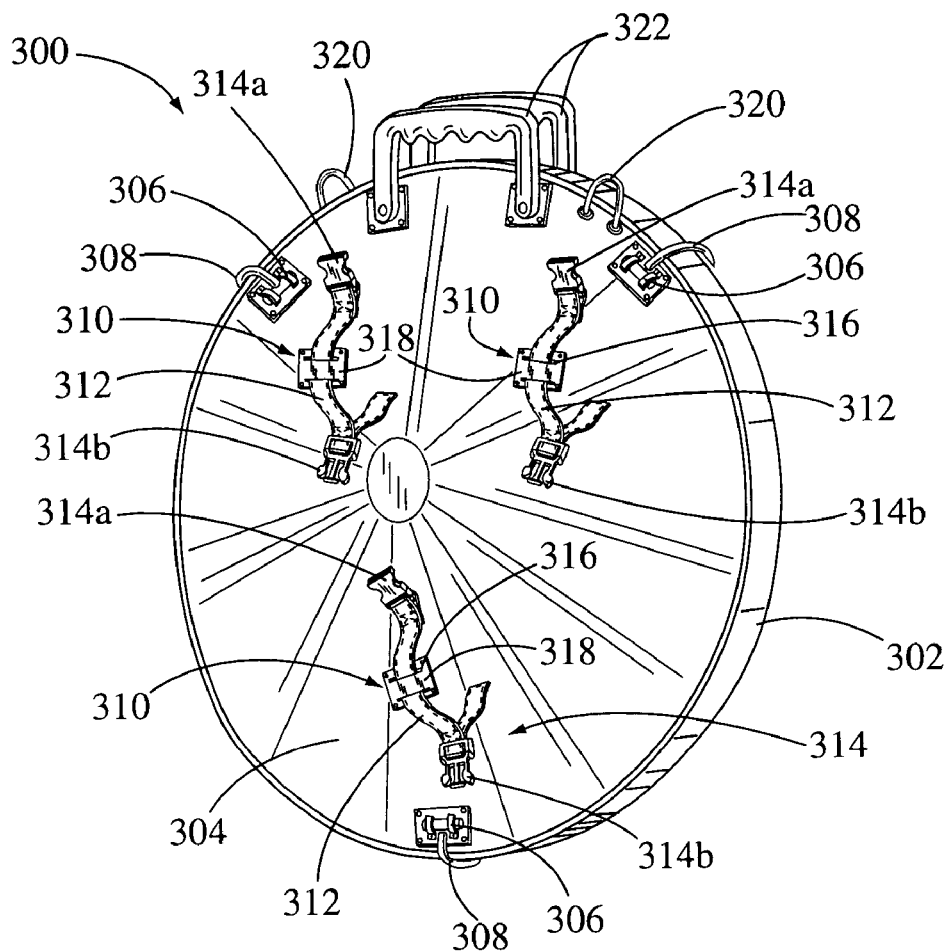
FIG. 5 is an isometric rear view of a hard shell wheel enclosure according to another embodiment of the invention.

Referring to FIG. 5, an alternative embodiment hard shell wheel container 300 is illustrated. Similar to the wheel bag described above, the hard shell container encloses a wheel of a bicycle and attaches to the bicycle to hold the wheel while the bicycle is being transported, such as on a rooftop carrier. Essentially, as illustrated, the container comprises front and rear pieces 302 & 304 that are formed from polymeric sheet material such as, but not limited to, ABS, nylon, polyethylene, PET, and polypropylene are joined together to form a clamshell type enclosure around a bicycle wheel. It is appreciated that the interior of the container can be lined, at least partially, with a resilient foam material to cushion the wheel, and prevent movement of the wheel that could generate noise during the transport of the wheel and container.

The front and rear pieces 302 & 304 of the container can be fabricated by any suitable process including vacuum molding, press forming, and injection molding. Typically, the two pieces are joined together with three or more clamps 306 that are riveted, bolted or boned to one or both of the pieces proximate the periphery thereof. These clamps can be of any suitable configuration as would be obvious to one of ordinary skill in the art, but the illustrated clamps include a hooked tongue 308 that is received into a slot (not shown) formed in the corresponding front piece that acts to secure the two pieces together when the clamp is engaged. It is appreciated that hook and loop material straps can also be utilized in variations of the alternative embodiment container to hold the two pieces together, wherein one of the hook and loop material portions is attached to a strap that is secured to one piece and the other of the hook and loop material portions is attached to the other piece.

Like the preferred wheel bag, the hard shell container attaches to the bicycle at three locations via connectors provided on the rear face or proximate the rear face of the rear piece of the shell. The container's connectors 310 can comprise connector straps 312, with buckles 314a & b that are fed through a slot 316 in a fixture 318 that is riveted to the rear piece 304 of the container as illustrated, or any other suitable type of connector including clamps. It is appreciated that the straps with buckles can be replaced with hook and loop straps. Further, a similar type connector can be utilized with the wheel bag 100 described above, wherein the slotted fixtures can be replaced with straps that are sewn to the bag's rear face on either end to form slots there between in which the connector straps with the buckles can freely slide. When clamps are utilized the clamps can be mounted to the rear face in such a manner as to permit the clamps to be positionally adjustable on the rear piece thereby allowing the container to fit bicycles and bicycle frames of differing sizes and configurations. Generally, the straps and/or clamps are riveted on to the rear piece, but they can be adhered to the rear face by any suitable means in variations including bolting, bonding, and sewing. Handles 322 or rings 320 for shoulder straps can also be provided on one or both of the front and rear pieces.

A Method of Using the Wheel Bag (or Shell Enclosure)

Figure 6:
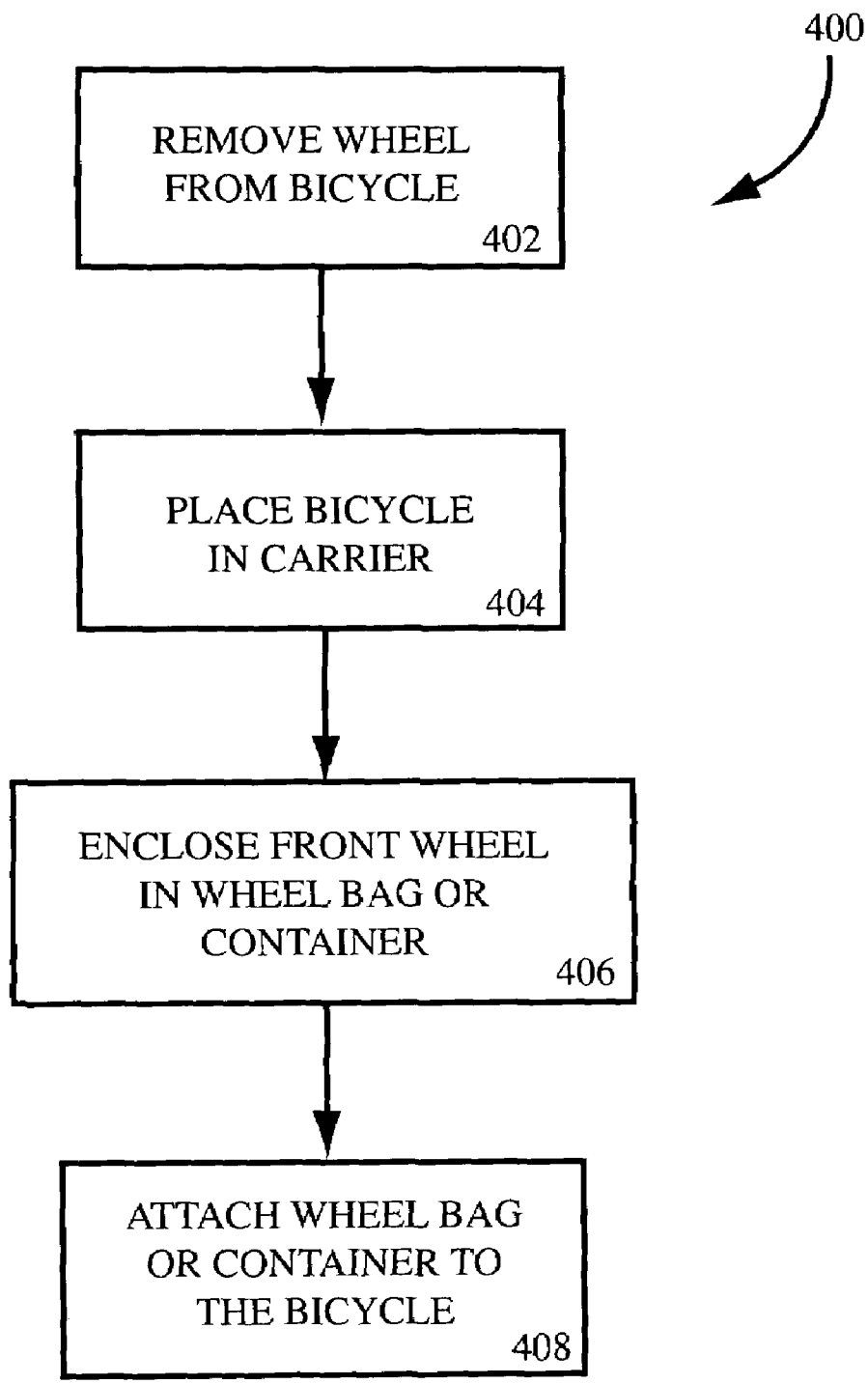
FIG. 6 is a flow chart illustrating a method of using the wheel bag or the hard shell container when transporting a bicycle.

Referring to FIG. 6, flow chart 400 describes the preferred use of either a wheel bag or hard shell container 300 in conjunction with a rooftop or similar rack for transporting a bicycle on an automobile.

First, as indicated in block 402, the front wheel 202 of the bicycle 200 is removed from the front fork 218 of the bicycle and is typically set aside. Next as indicated in block 404, the bicycle sans its front wheel is placed on the rooftop carrier. Typically, the rear wheel 226 is placed in a track 250 provided on the carrier and the dropout slots of the front fork are placed in a dummy axle (not shown) on the carrier. A quick release cam bolt 256 or nuts (not shown) are tightened to secure the front fork to the dummy axle.

As indicated in block 406, the wheel is placed in the wheel bag or hard shell container and the bag or container is closed to contain the wheel. Typically, a wheel bag will be zipped shut. If the zipper pull handles 126 have holes in them, the user can pass a rope, a chain, the shackle of a lock 127, a twist tie or other device through both the holes to help ensure that the zipper will remain shut. With the hard shell container, the pieces 302& 304 of the container are typically clamped shut.

Next as provided in block 408, the wheel bag or container with the wheel contained therein is attached to the bicycle 200. Using the wheel bag 100 as illustrated in FIGS. 1–4, the user aligns the primary connectors 112, 116 & 120 with particular locations on the bicycle such as the bicycle frame tubes. The straps of the primary connectors are then placed over the frame tube or other component of the bicycle and secured, typically through the use of hook and loop material or buckles. In FIGS. 3 and 4, the straps of the first and second connectors 112 & 116 are placed over and around the top tube 206 of the bicycle frame and secured with hook and loop material, and the strap of the third connector 120 is looped around the downtube 210, buckled and the strap is tightened as necessary. Optionally, additional connectors 134 & 136, typically in the form of hook and loop material straps can be looped around portions of the bicycle to further secure the bag. The hard shell container 300 illustrated in FIG. 5 is connected to the bicycle in a similar manner.

Although the method of securing a bicycle 200 and its front wheel 202 in a wheel bag or hard shell container to a rooftop bicycle rack has been described with reference to the particular order of operations illustrated in FIG. 6, the actual order of operations can vary as would be obvious to one of ordinary skill in the art. For instance, the wheel bag could be secured to the bicycle before the wheel is placed in the bag. Further, the same method may be applicable to other types of racks and accordingly, the described method is not intended to be limited just to use with rooftop racks but with any suitable type of rack where a wheel of the bicycle must be removed before securing the bicycle in the rack.

OTHER ALTERNATIVE EMBODIMENTS AND VARIATIONS

The embodiments of the wheel bag and hard shell container as illustrated in the accompanying figures and described above are merely exemplary and are not meant to limit the scope of the invention. It is to be appreciated that numerous variations to the invention have been contemplated as would be obvious to one of ordinary skill in the art with the benefit of this disclosure. All variations of the invention that read upon the appended claims are intended and contemplated to be within the scope of the invention.

For instance, any type of connectors that can securely attach the wheel bag or container to the bicycle can be utilized. Further, the types of connectors can be intermixed in any particular embodiment of the wheel bag or container. For example, one connector could comprise a clamp, while the other connectors could comprise straps with hook and loop material or buckles. Further, although the preferred embodiments utilize three primary connectors located in locations that essentially form the points of a triangle, embodiments that utilize four or more connectors are also anticipated. The shape of the containers need not be round or circular and they can be configured to contain additional items in addition to the front wheel, such as tools or a second wheel.

We claim:

1. A combination comprising:
    a bicycle, the bicycle including a frame, a front fork pivotally connected to the frame, and a rear wheel;
    a bicycle rack adapted for mounting to an automotive vehicle, the bicycle being secured to the bicycle rack;
    a front wheel of the bicycle removed from the front fork; and
    an enclosure substantially containing the front wheel therein, the enclosure being secured to the bicycle at two or more locations.

2. The combination of claim 1, wherein the enclosure is secured to the frame.

3. The combination of claim 1, wherein the bicycle is at least partially secured to the bicycle rack at the front fork.

4. The combination of claim 1, wherein the enclosure comprises a hard-shell container.

5. The combination of claim 1, wherein the two or more locations comprise at three locations.

6. The combination of claim 1, wherein the enclosure comprises a fabric bag.

7. A bag for attaching to a bicycle:
    an enclosure sized to substantially contain a front wheel of the bicycle that has been removed from the bicycle, the enclosure having opposing first and second faces;
    a first connector attached to the enclosure on or proximate the first face at a first location;
    a second connector attached to the enclosure on or proximate the first face at a second location; and
    a third connector attached to the enclosure on or proximate the first face at a third location, each location forming a corner of a hypothetical triangle and each connector being adapted to securely attach with a portion of the bicycle.

8. The bag of claim 7, wherein the first, second and third connectors are attached to the enclosure on the first face at respective first, second and third locations.

9. The bag of claim 7, wherein the first connector comprises at least one strap coupled at one end to the bag at the first location and corresponding surfaces of hook and loop material, wherein the strap is adapted to at least partially wrap around a portion of the bicycle and wherein the corresponding hook and loop material surfaces are joined to secure the bag to the bicycle at the first location.

10. The bag of claim 7, wherein the first connector comprises at least one strap coupled at one end to the bag at the first location and a corresponding buckle, wherein the strap is adapted to (i) at least partially wrap round a portion of the bicycle and (ii) secure the bag to the bicycle at the first location by way of the buckle.

11. The bag of claim 7, wherein the enclosure is conformal about the bicycle wheel when the bicycle wheel is contained therein.

12. The bag of claim 7, wherein the first and second faces are primarily flexible except at locations proximate the center of each face wherein a rigid or semi-rigid sheet material is secured to the respective first or second face.

13. The bag of claim 7, wherein the enclosure is comprised of an elastic fabric material.

* * * * *